UNITED STATES PATENT OFFICE.

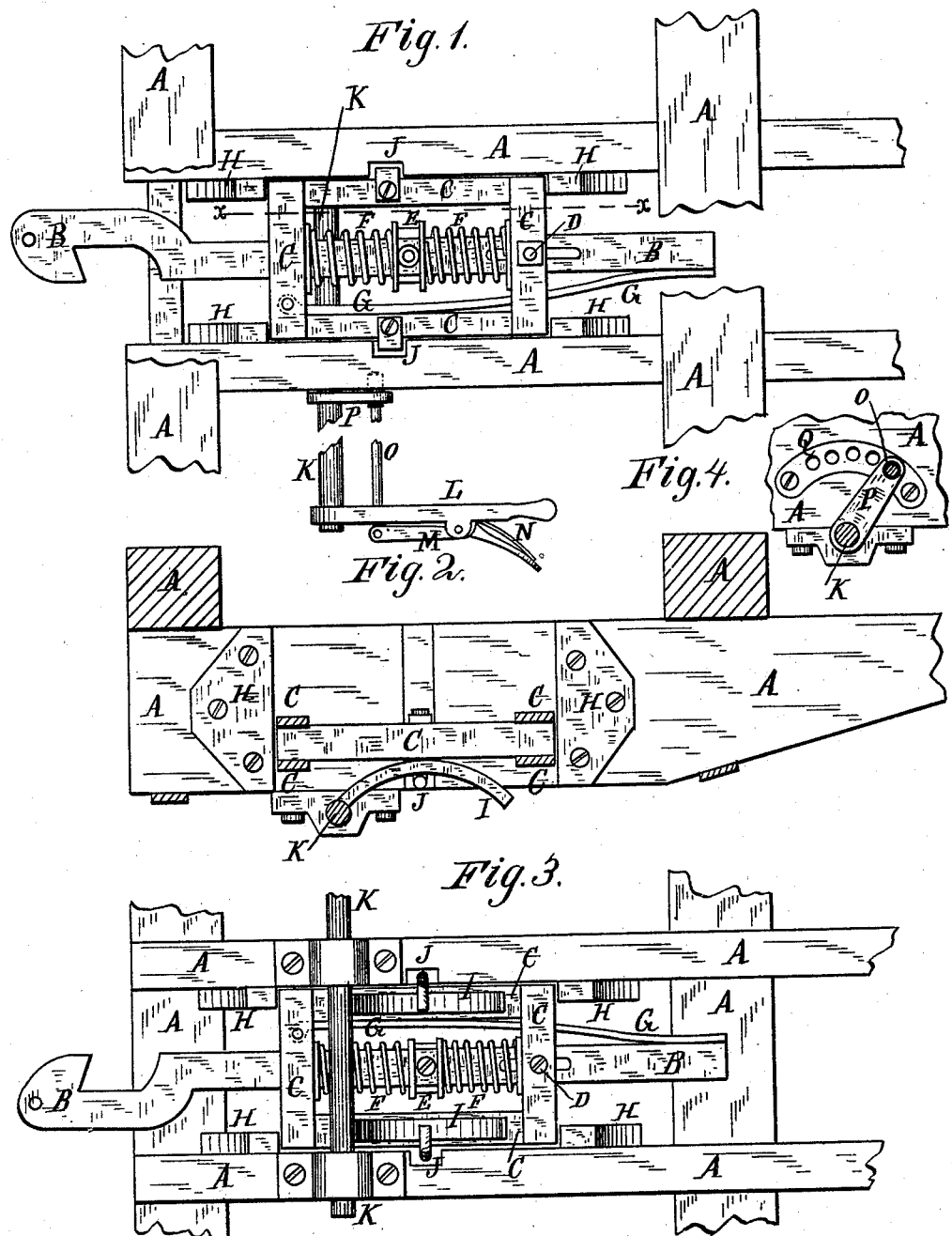

JAMES N. WINN, OF DARIEN, GEORGIA.

CAR-COUPLING.

SPECIFICATION forming part of Letters Patent No. 223,426, dated January 6, 1880.

Application filed November 10, 1879.

*To all whom it may concern:*

Be it known that I, JAMES N. WINN, of Darien, in the county of McIntosh and State of Georgia, have invented a new and useful Improvement in Adjustable Car-Couplings, of which the following is a specification.

Figure 1 is a top view of my improved car-coupling, shown as applied to a car-frame, part of the frame being broken away to show the construction. Fig. 2 is a detail longitudinal section of the same, taken through the line $x$ $x$, Fig. 1. Fig. 3 is a bottom view of the same. Fig. 4 is a detail view of the device for locking the coupling in place when adjusted.

The object of this invention is to furnish car-couplings which shall be so constructed that they may be moved up and down to adapt them to couple with cars higher or lower than those to which they are attached, and which shall be simple in construction and reliable in use.

Similar letters of reference indicate corresponding parts.

A represents the frame of a car. B is the coupling-hook, which passes through the spaces between the end bars of the frame C, and is secured to the rear pair of end bars by a bolt, D, which passes through the said end bars and through a longitudinal slot in the said hook-bar.

To the hook-bar B, at the center of the frame C, is attached a collar, E, against which rest the inner ends of two spiral springs, F, the outer ends of which rest against the end bars of the frame C. The hook B is held forward, to keep it in gear with the hook of an adjacent car, by a spring, G, the forward end of which is attached to a forward corner of the frame C, and its rear end presses against the side of the rear end of the hook-bar B.

The frame C is formed by attaching end bars to the upper and lower sides of the ends of two side bars. The corners of the frame C rest against four iron blocks, H, attached to the longitudinal bars of the frame A, between which the hook-bar B is placed, and to which the draft is applied. The inner edges of the blocks H are vertical, so that the frame C, and with it the coupling-hook B, may be moved up and down to adjust it to any desired level. The frame C and its attachments are supported by the curved arms or cams I, upon which the middle parts of the side bars of the frame C rest, and upon which they are held by the hooks J, attached to the said side bars, and passing around the said curved arms or cams.

The forward ends of the curved arms or cams I are attached to or formed upon the rod or shaft K, which works in bearings attached to the car-frame A, and to its end is attached a lever, L, by means of which it is turned to raise and lower the frame C and its attachments. To the side of the lever L is pivoted a small hand-lever, M, the upper end of which is held out by a spring, N, interposed between it and the lever L. To the lower end of the hand-lever M is pivoted the outer end of a rod, O, which passes through a guide-hole in the lever L and through a guide-hole in the outer end of an arm, P, rigidly attached to the shaft K, so that the shaft K and the rod O may always be held parallel with each other.

The inner end of the rod O enters one or another of the holes in the curved plate Q, attached to the outer side of one of the bars between which the frame C is placed, so as to lock the said frame securely in any position into which it may be placed.

The shaft K may be arranged below the car-frame, as shown in the drawings, or above it, or at its end, and the lever L may be at the side or at the end of the car, as may be desired, the shape of the curved arms or cams I being varied as the position of the rod O may require.

With this construction high and low cars may be coupled together with as much facility as if they were all of the same height, the hooks B of the adjacent cars always meeting each other squarely and always drawing against each other squarely.

Having thus fully described my invention, I claim as new and desire to secure by Letters Patent—

1. The combination, in a car-coupling, of the slotted hook-bar B, having collar E, the vertically-movable frame C, carrying bolt D, the spiral springs F, and the plate-spring G, as shown and described.

2. The combination, in a car-coupling, with a vertically-movable frame, C, of a rock-shaft cam, I, and hooks J, as and for the purpose specified.

3. The combination of the lever and spring M N, the catch-rod O, the guide-arm P, and the catch-plate Q with the lever L, the shaft K, and the frame A, for locking the frame C in place, substantially as herein shown and described.

JAMES N. WINN.

Witnesses:
WM. GEORGE, Jr.,
W. S. MIDDLETON.